Sept. 12, 1950   O. W. OTT   2,521,867
FORCED AIR HEATING SYSTEM
Filed Oct. 22, 1946
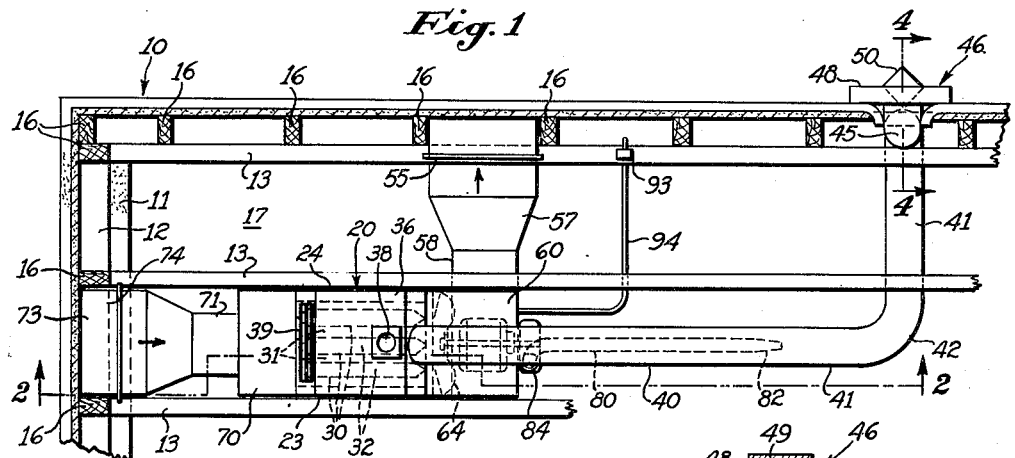
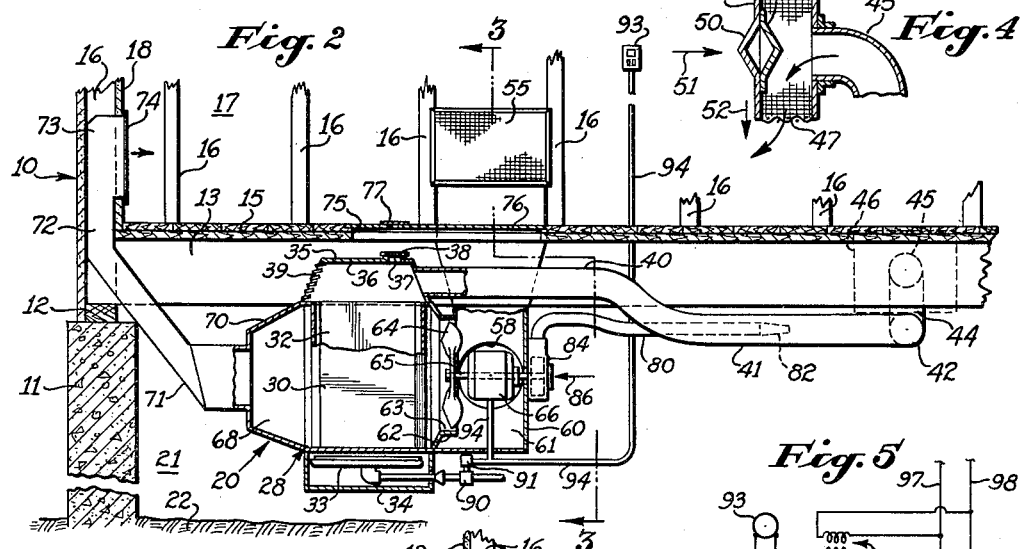
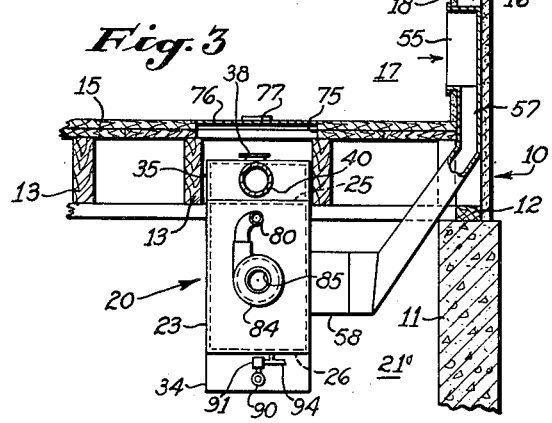
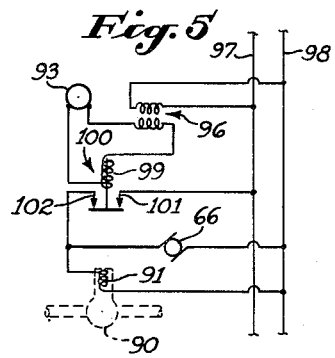
INVENTOR:
ORAN W. OTT
BY HIS ATTORNEYS
HARRIS, KIECH, FOSTER & HARRIS Patented Sept. 12, 1950

2,521,867

UNITED STATES PATENT OFFICE 2,521,867

FORCED AIR HEATING SYSTEM

Oran W. Ott, San Marino, Calif.

Application October 22, 1946, Serial No. 704,925

14 Claims. (Cl. 237—53)

My invention relates to a self-contained heating system employing a sub-floor furnace. More particularly the invention relates to a compact forced air, unit type heating system in which the furnace is adapted to be disposed in a relatively shallow space below the floor of a building.

Conventional forced air heating systems employ a central heating plant with relatively long ducts enclosed by the walls of the building structure. In a frame-type structure it is usually necessary to remove cross bracing or a portion of the frame to provide space for the ducts, thus weakening the structure. In addition, there are substantial heat losses from such long ducts.

An attempt has been made to simplify such a heating system by using one or more floor furnaces providing no long ducts, but supplying heated air through a floor-mounted register. Such floor furnaces do not conventionally employ any means for forcing the air into the room, albeit it would be desirable to force the warm air into the room to maintain a circulation of air therein and produce more uniform heating. Conventional floor furnaces draw air from the room in a zone immediately around the rising stream of hot air, the circulation being induced solely by thermal means. The adjacency of the oppositely flowing cold and warm air streams is undesirable.

It is an object of the present invention to provide a novel heating system of the forced air type employing a furnace adapted to be disposed in a relatively shallow space below the floor of a building. This shallow space can be the zone between the ground floor of a building and the surface of the earth or it may be a zone immediately below any upper floor of a multi-story building.

Another object is to provide a compact heating system of this type particularly well adapted to installation in frame-type structures and which does not weaken the building structure.

A further object is to provide a heating system employing a novel relationship of supply and return ducts, e. g., a heating system which can be installed near the corner of a room below the floor thereof and which will produce a desirable circulation of air in the room to minimize stagnant zones which are hotter or cooler than the desired temperature.

A further object is to provide a heating system employing a sub-floor furnace which can be cheaply manufactured and easily installed.

Most conventional furnaces indirectly heat the air from products of combustion discharging into a suitable vent. It is conventional that the vent extend upwardly in a wall of the building structure to a position above the roof. This weakens the structure and produces a fire hazard. It is an object of the present invention to design a heating system which need not employ such a vertical vent extending above the roof. In this connection the invention includes among its objects the provision of a novel draft-inducing means associated with the vent; to provide a control system which simultaneously controls the furnace and the draft-inducing means; to provide a vent pipe which may extend in a generally horizontal direction through an external wall of the building; and to provide a novel discharge outlet for such a vent pipe.

A further object is to provide a heating unit employing a single electric motor or other drive means for operating a main fan and an auxiliary fan, the main fan circulating air into the room and the auxiliary fan supplying a stream of air to the vent means. A further object is to jet a stream of cool air into a vent means carrying products of combustion to cool these products and aid in inducing a flow thereof.

Further objects and advantages of the invention will be evident to those skilled in the art from the following description and illustration of an exemplary embodiment.

Referring to the drawing:

Fig. 1 is a horizontal sectional view of a building structure, taken just below the level of the floor, incorporating the invention.

Fig. 2 is a vertical sectional view taken as indicated by the line 2—2 of Fig. 1.

Fig. 3 is a transverse vertical sectional view taken as indicated by the lines 3—3 of Fig. 2.

Fig. 4 is a fragmentary sectional view of the vent pipe discharge outlet, taken as indicated by the line 4—4 of Fig. 1 and Fig. 5 is a wiring diagram illustrating the preferred control circuit.

The invention is illustrated as applied to a building structure of the frame type, indicated generally by the numeral 10. As best shown in Figs. 2 and 3 the usual concrete foundation 11, illustrated at one corner of the building structure or room thereof, carries a plate 12.

Resting on this plate are joists 13, these joists being ordinarily spaced 16″ on centers. A floor 15 rests on the joists and studs 16 extend upwardly therefrom to form the walls of a room 17, the studs being faced with a suitable interior wall covering 18.

The invention includes a sub-floor heating unit or furnace indicated generally by the numeral 20 and adapted to be secured to the joists 13 in any conventional manner to be disposed in a relatively shallow space 21 between the floor 15 and the ground, indicated at 22, or in any similar shallow space below any upper floor of a multi-story building. The furnace 20 includes a shell or main housing including side walls 23 and 24, a top wall 25 and a bottom wall 26 cooperating in defining a horizontally disposed heating chamber 28.

Extending vertically through the heating chamber 28 is a plurality of heating elements 30 spaced from each other to define passages 31, best shown in Fig. 1. Each heating element 30 provides a passage 32 for conducting products of combustion upwardly from a burner 33, positioned in a sub-housing 34, to a bonnet 35. The bonnet 35 may be bounded by a continuation of the side walls 23 and 24 and includes a top wall 36 providing the usual collared lighter hole 37 giving access to the burner 33 and normally closed by the usual windowed cover 38. One end wall of the bonnet 35 provides a draft diverter indicated as a plurality of louvers 39 between which air may enter the interior of the bonnet 35.

The products of combustion are conducted from the bonnet 35 by a suitable vent means which, in accordance with the invention, is substantially horizontally disposed. The preferred vent means includes a vent pipe 40 which dips below the joists 13 to provide a horizontal portion 41 bent or elbowed at 42 to extend beneath the joists and transversely thereof toward one side wall of the building structure 10. The portion 41 may extend horizontally through this side wall. However, in the preferred arrangement the horizontal section 41 is joined by an elbow to a vertical section 44 which carries another elbow 45 turning horizontally outwardly through the side wall of the building structure 10.

This other elbow 45 directs the products of combustion to a discharge outlet fitting 46, best shown in Figs. 1 and 4. It includes a box-like structure open at its two sides and its bottom to communicate with the surrounding atmosphere through an interstitial member such as a screen 47. A front wall 48 of the discharge outlet structure 46 provides internal and external diverters 49 and 50, each preferably in the shape of a pyramid. The inner diverter 49 deflects the products of combustion downwardly and sidewardly to be discharged through the screen-covered openings. The outer diverter 50 tends to deflect any wind blowing in the direction of the arrow 51 to establish three beneficial air streams flowing respectively along the front surface of the front wall 48 toward opposite sides and toward the bottom thereof. For example, the lower surface of the pyramidal diverter 50 deflects the wind to create a downwardly moving stream indicated by the arrow 52 of Fig. 4. This stream aids in aspirating products of combustion from the lower interior of the discharge outlet fitting 46.

The invention provides means for forcing a stream of air through the heating chamber 28 to be heated by the heating elements 30 before discharge into the room. In addition, it is distinctly preferable to provide for return of air from the room to the heating chamber 28. As illustrated, this return air may be drawn from the room through a return grille 55 forming a part of a suitable wall register preferably located a short distance above the floor 15 at one side of the room. This wall register communicates with a return air duct 57 angling into the shallow space 21 and ending in a circular pipe or return duct connection 58 which opens through one side wall of a housing 60 to communicate with and supply the return air to an entrance chamber 61. Between the heating chamber 28 and the entrance chamber 61 is a barrier 62 providing a flange surrounding an opening 63. In this opening is disposed a main fan 64 connected to a shaft 65 of an electric motor 66, this fan turning in a direction to force air from the entrance chamber 61 through the heating passages 31 and into an exit chamber 68 formed by a hood 70 of the furnace.

Communicating with the hood 70 is an air delivery means for delivering the heated air to the room. This means includes a warm air duct connection at the end of the furnace and communicating with a warm air duct 71 angling upwardly between the joists 13 and providing a vertical portion 72 disposed in one end wall of the room. The warm air duct 71 terminates in a wall register 73 discharging the air through a suitable grille 74 into the room, preferably at right angles to the direction of flow of the return air into the grille 55.

The register 72 may be disposed at any suitable height in the end wall of the room but, for most economical installation, is positioned near the floor 15 as suggested in Fig. 2. It will be noted that the angled portions of the return air duct 57 and the warm air duct 71 clear the foundation 11 while requiring no substantial cutting of the frame of the building.

The floor 15 is cut to provide an opening 75 above the furnace of sufficient size to permit lowering of the furnace therethrough. This floor opening is covered by a steel floor plate 76 having a small opening directly above the windowed cover 38 of the lighter hole 37, this small opening being closed by a small cover 77 hinged or otherwise secured to the floor plate.

The invention includes a draft-inducing means for establishing a forced flow of the products of combustion along the vent pipe 40 in a direction away from the bonnet 35. The preferred draft-inducing means includes a structure for jetting a stream of cool air into the vent pipe in a manner to induce such flow of the products of combustion while simultaneously cooling these products and also drawing air into the bonnet 35 through the louvers 39 of the draft diverter. As best shown in Figs. 1 and 2, an air pipe 80 enters the horizontal portion 41 of the vent pipe and terminates in a nozzle 82 disposed centrally in this pipe. A stream of air forced through the pipe 80 will thus induce a flow of the products of combustion along the vent pipe and through the annular space between this pipe and the air pipe 80.

The preferred arrangement for delivering cool air to the air pipe 80 includes an auxiliary fan 84 operatively connected to the motor 66. Preferably the auxiliary fan 84 is of the centrifugal or blower type and is mounted on the exterior of the housing 60. Air from the space 21 enters a central opening 85 of the auxiliary fan, as suggested by the arrow 86, to be pressured and discharged into the air pipe 80. The aspirating action of the air stream reduces the pressure in the bonnet 35 whereby additional cool air from the space 21 enters the bonnet through the louvers 39 to cool the products of combustion initially. Further and very substantial cooling of these products of combustion is effected by discharge of the air stream thereinto from the nozzle 82. The cooling of the products of combustion is so marked that no expensive heat-protecting cover is required for the vent pipe.

It is preferred that the main fan 64 and the auxiliary fan 84 should come into operation simultaneously. This is accomplished by connecting both fans directly to the motor 66. It is preferred also that these fans be set into operation simultaneously with the burner 33. To accomplish this, a magnetic valve 90 is disposed in the fuel supply pipe to the burner, this valve providing a solenoid 91 adapted, when energized, to open the valve, the valve being closed when the solenoid is deenergized.

If thermostatic control is desired, a thermostat 93 is disposed at any suitable position in the room and connected, through a suitable conduit system 94, to the motor 66 and the solenoid 91. Fig. 5 shows a wiring diagram for this type of installation. Referring thereto, a step-down transformer 96 provides a primary winding connected across conductors 97 and 98 of a conventional lighting circuit. The low voltage secondary winding of this transformer is connected to a winding 99 of a relay 100 through the conventional contacts of the thermostat 93. When the thermostat calls for more heat, the winding 99 is energized to complete a circuit through contacts 101 and 102 to energize simultaneously the motor 66 and the solenoid 91 of the magnetic valve, thus starting the fans 64, 84 and opening the valve 90 to the burner.

At this time a circulation of air is set up by the main fan 64, all or a portion of this air being drawn from the room through the return air duct 57. As this air flows through the heating chamber 28 it is heated by the products of combustion rising in the passages 32 of the heating elements 30, the heated air being discharged through the warm air duct 71 into the room. The draft-inducing means starts to operate simultaneously with the burner and forces the products of combustion along and from the vent pipe 40 to the fitting 46 to discharge into the atmosphere. These products are spread in the fitting 46 as previously described.

The invention is particularly well adapted to economical installation beneath the floor near one corner of the room to be heated. When thus installed, the direction of flow of return air to the return grille 55 is at right angles to the direction of discharge of warm air from the warm air register 73. This arrangement has numerous advantages as follows:

In the first place, the warm air register and the return register are disposed close to each other in one corner of the room so that the return air duct 57 and the warm air duct 71 can be short and simple to construct and install. In fact, the return register can be in one wall in direct alignment with the entrance chamber 61 and the warm air register can be in another intersecting wall in direct alignment with the hood 70. I believe it to be novel to employ short ducts of this nature extending respectively to the side and end of the furnace.

In the second place, this type of installation provides a very effective circulation of air in the room tending to prevent "hot spots" or zones of localized temperature inequality. The pressured warm air discharging from the warm air register 73 flows peripherally around the room before being drawn into the return air grille 55. Even if the warm air and return grilles are at the same level, as suggested in Fig. 2, there will be little direct by-pass of warm air to the return register. If desired, however, the registers may be installed at different heights to give a helix-like circulation in the room. The circulation follows around the room, substantially paralleling the four walls and the resulting flow tends to maintain a much more uniform temperature in the room than would be the case if the registers were in the same wall or in opposed walls.

It will be apparent that the invention has many advantages because of its size and placement with reference to the building structure. Thus, by sizing the bonnet 35 to extend between adjacent joists 13, a larger heating unit can be designed to fit into the relatively shallow space 21. At the same time, the arrangement of return and hot air ducts is such that a minimum amount of cutting of the frame of the building is required with the result that there is substantially no weakening thereof. By proper design the relative positions of the hot air and return ducts can be related to extend between existing studs 16 of the building structure thus eliminating complicated and costly sidewise turns in the ducts.

Various changes and modifications can be made without departing from the spirit of the invention as defined in the appended claims.

I claim as my invention:

1. In a forced air heating system adapted to be disposed in a relatively shallow space above a substantially flat ground surface below the floor of a room of a building structure having a foundation, the combination of: a furnace of a size to be mounted in said shallow space, said furnace providing a heating chamber, internally-passaged heating elements traversing said heating chamber, a burner for delivering hot products of combustion to the passages of said heating elements and a bonnet adapted to receive said products of combustion from said passages of said heating elements, said furnace providing entrance and exit chambers at substantially the same elevation and positioned below said bonnet; a main fan for forcing a stream of air through said heating chamber to be heated by said heating elements and thence into said exit chamber; air delivery means for conducting the heated air from said exit chamber upwardly above said floor to discharge into said room; a vent pipe extending substantially horizontally from said bonnet in said space below said floor and to the atmosphere outside said building structure at an elevation just above said foundation to conduct the products of combustion from said bonnet; and draft-inducing means including an auxiliary fan for pressuring and jetting a stream of cool air into said vent pipe in the general direction of flow of said products of combustion therein to aspirate said products of combustion from said bonnet.

2. A heating system as defined in claim 1, including an electric motor and means for connecting same to operate both said main fan and said auxiliary fan simultaneously.

3. A heating system as defined in claim 1, in which said furnace includes a housing providing said entrance chamber, and including a short intake means communicating with said entrance chamber for conducting return air from said room to said entrance chamber, said main fan forcing said return air through said heating chamber.

4. A heating system as defined in claim 1, in which said furnace includes a housing providing said entrance chamber, and in which said auxiliary fan of said draft-inducing means is disposed outside said housing and includes a cool air intake drawing cool air from adjacent said housing, and in which said heating system includes an intake means communicating with said entrance chamber for conducting return air from said room to said entrance chamber, said main fan forcing said return air through said heating chamber, and an electric motor for driving both said main fan and said auxiliary fan.

5. A heating system as defined in claim 1, in which said draft-inducing means comprises a nozzle disposed centrally within the otherwise-unrestricted vent pipe to provide an annular space around said nozzle through which said products of combustion may move.

6. In a forced air heating system adapted to be disposed in a relatively shallow space below the floor of a room of a building structure, said floor being supported by spaced joists and said joists being supported by a foundation, the combination of: a furnace having a heating chamber, internally-passaged heating elements extending upwardly through said heating chamber, a burner below said heating elements for delivering hot products of combustion to the lower ends of the passages thereof and a bonnet at the upper end of said furnace to receive the products of combustion from said passages, said furnace being of a size to be mounted in said shallow space and said bonnet being of a size to extend upwardly between said joists when said furnace is thus mounted; means for forcing a stream of air through said heating chamber to be heated by said heating elements; air delivery means for delivering the heated air stream to said room above the level of said floor; a vent pipe extending from said bonnet between said joists and providing a portion dipping beneath said joists and extending substantially horizontally to a position outside said building structure just above said foundation and opening on the atmosphere exterior of said building adjacent said position; and means for jetting a flowing stream of air into said vent pipe in a direction away from said bonnet, said last-named means constituting a draft-inducing means for establishing a forced flow of said products of combustion along said vent pipe in a direction from said bonnet.

7. In a forced air heating system adapted to be disposed in a relatively shallow space below the floor of a room of a building structure, said floor being supported by spaced joists, the combination of: a furnace having a heating chamber, internally-passaged heating elements extending upwardly through said heating chamber, a burner below said heating elements for delivering hot products of combustion to the lower ends of the passages thereof and a bonnet at the upper end of said furnace to receive the products of combustion from said passages, said furnace being of a size to be mounted in said shallow space and said bonnet being of a size to extend upwardly between said joists when said furnace is thus mounted; means including a main fan for forcing a stream of air through said heating chamber to be heated by said heating elements; air delivery means for delivering the heated air stream to said room above the level of said floor; a vent pipe extending from said bonnet between said joists and providing a portion dipping beneath said joists and extending substantially horizontally to a position outside said building structure to communicate with the atmosphere at a position substantially no higher than said bonnet; and draft-inducing means for establishing a forced flow of said products of combustion along said vent pipe in a direction from said bonnet, said draft-inducing means including an auxiliary fan operatively connected to said main fan and means for jetting the discharge of said auxiliary fan into said vent pipe to cool said products of combustion therein and force same along said vent pipe in a direction away from said bonnet.

8. In a forced air heating system adapted to be disposed in a relatively shallow space below a floor of a room of a building structure, the combination of: a furnace of a size to be mounted in said shallow space, said furnace providing a heating chamber, internally-passaged heating elements traversing said heating chamber, a burner for delivering hot products of combustion to the passages of said heating elements and a bonnet adapted to receive said products of combustion from said passages of said heating elements, said bonnet including openings for receiving air from the surrounding atmosphere; means including a main fan for circulating air from said room through said heating chamber and to said room; a vent pipe extending substantially horizontally from said bonnet in the relatively shallow space below said floor and thence to the exterior of said building structure to conduct the products of combustion from said bonnet; and a draft-inducing means for establishing a forced flow of said products of combustion along said vent pipe in a direction away from said bonnet to induce a flow of air through said openings of said bonnet into the interior of said bonnet to mix with said products of combustion therein.

9. In a forced air heating system adapted to be disposed in a relatively shallow space below the floor of a room of a building structure, the combination of: a furnace of a size to be mounted in said shallow space, said furnace providing a heating chamber, internally-passaged heating elements traversing said heating chamber, a burner for delivering hot products of combustion to the passages of said heating elements and a bonnet adapted to receive said products of combustion from said passages of said heating elements; means including a main fan for circulating air from said room through said heating chamber and to said room; a vent pipe extending substantially horizontally from said bonnet in the relatively shallow space below said floor and thence to the exterior of said building structure to conduct the products of combustion from said bonnet; and a draft-inducing means for establishing a forced flow of said products of combustion along said vent pipe in a direction away from said bonnet, said bonnet including openings for the entry of air thereinto and said draft-inducing means comprising means including an auxiliary fan for jetting a stream of air into said vent pipe in a direction away from said bonnet to cool the products of combustion in the vent pipe and force same therealong in said direction and draw air into said bonnet through said openings thereof.

10. In a forced air heating system adapted to be mounted in a relatively shallow space below the floor of one corner of a room having two intersecting walls, said system including: a hot air register in one of said walls; a return register in the other of said walls, said registers being at substantially the same height from said floor and facing at right angles to each other in said corner of said room; a furnace of a size to be mounted in said relatively shallow space beneath said one corner of said room, said furnace providing an entrance chamber, an exit chamber, a heating chamber connecting said entrance and exit chambers, upright internally-passaged heating elements traversing said heating chamber, a burner for delivering hot products of combustion to the lower interior of the passaged heating elements and a bonnet for receiving products of combustion from the upper interior of said heating elements; a return air duct extending from said return register downwardly and inwardly into said shallow space to communicate with said entrance chamber; a warm air duct extending from said hot air register downwardly and inwardly into said shallow space to communicate with said exit chamber, said warm air and return ducts extending to said heating unit substantially at right angles to each other and the direction of air flow from said hot air register being substantially perpendicular to the direction of return air flow to said return register; a main fan for forcing air through said return air duct and through said entrance, heating and exit chambers and said warm air duct to establish a circulation of air from said hot air register across the axis of said return register and peripherally around said room to return to said return register; vent means providing a substantially horizontal portion extending from said bonnet in said shallow space to a position below one of said walls and thence to the atmosphere adjacent the lower end of said one of said walls and substantially opposite said bonnet; and draft-inducing means for establishing a forced flow of said products of combustion along said portion of said vent means in a direction away from said bonnet.

11. In a forced air heating system adapted to be mounted in a relatively shallow space below the floor of one corner of a room having two intersecting walls respectively providing hot air and return registers, the combination of: a furnace of a size to be mounted in said relatively shallow space beneath said one corner of said room, said furnace providing an entrance chamber, an exit chamber, a heating chamber connecting said entrance and exit chambers, upright internally-passaged heating elements traversing said heating chamber, a burner for delivering hot products of combustion to the lower interior of the passaged heating elements and a bonnet for receiving products of combustion from the upper interior of said heating elements; a return air duct extending from said return register downwardly and inwardly into said shallow space to communicate with said entrance chamber; a warm air duct extending from said hot air register downwardly and inwardly into said shallow space to communicate with said exit chamber, said warm air and return ducts extending to said heating unit substantially at right angles to each other and the direction of air flow from said hot air register being substantially perpendicular to the direction of return air flow to said return register; a main fan for forcing air through said return air duct and through said entrance, heating and exit chambers and said warm air duct to establish a circulation of air peripherally around said room; vent means providing a substantially horizontal portion extending from said bonnet in said shallow space through one of said walls and thence to the atmosphere, said vent means providing an outlet portion including a box-like discharge structure opening on the atmosphere and having a front wall spaced from but extending across said outlet portion to deflect the products of combustion from said vent means along the outside of that wall through which said products move, and draft-inducing means for establishing a forced flow of said products of combustion along said substantially horizontal portion of said vent means in a direction away from said bonnet and toward said outlet portion of said vent means.

12. A heating system as defined in claim 11 in which said box-like discharge structure is open at its sides and bottom to the atmosphere, and in which said front wall comprises an angled diverter for deflecting the products of combustion toward said open sides and bottom as they issue from said outlet portion.

13. In a forced air heating system adapted to be mounted in a relatively shallow space below the floor of one corner of a room having two intersecting walls respectively providing hot air and return registers, said floor being supported on spaced joists and said joists being supported by foundation walls respectively below said room walls the combination of: a furnace of a size to be mounted in said relatively shallow space beneath said one corner of said room, said furnace providing an entrance chamber, an exit chamber at substantially the same level as said entrance chamber, a heating chamber connecting said entrance and exit chambers, upright internally-passaged heating elements traversing said heating chamber, a burner for delivering hot products of combustion to the lower interior of the passaged heating elements and a bonnet above said level and sized to extend upwardly into an interjoist space for receiving products of combustion from the upper interior of said heating elements; a return duct connection extending from said entrance chamber toward one of said side walls; a warm air duct connection extending from said exit chamber toward the other of said side walls, the axes of said connections being substantially perpendicular to each other; a main fan intaking from said entrance chamber and exhausting into said heating chamber; vent means providing a substantially horizontal portion extending from said bonnet in said interjoist space to a position below said floor but above said foundation to communicate with the atmosphere substantially at the level of such position; and draft-inducing means for establishing a forced flow of said products of combustion along said portion of said vent means in a direction away from said bonnet.

14. In a forced air heating system adapted to be mounted in a relatively shallow space below the floor of a room of a building structure, said floor being supported by spaced joists and said joists being supported by a foundation, said heating system being adapted to be mounted below one corner of a room having two intersecting walls respectively providing hot air and return registers, the combination of: a furnace of a size to be mounted in said relatively shallow space, said furnace providing entrance and exit chambers and a heating chamber connecting said entrance and exit chambers, upright internally-passaged heating elements traversing said heating chamber, a burner for delivering hot products of combustion to the lower interior of the passaged heating elements and a bonnet for receiving said products of combustion from the upper interior of said heating elements, said bonnet being sized to extend into an interjoist space; a heated air pipe extending from said furnace toward said hot air register; a return air pipe extending from said furnace toward said return register; a vent pipe extending from said bonnet at a higher elevation than said heated air pipe and said return air pipe, said vent pipe extending substantially horizontally through one of said walls to communicate with the atmosphere at a level substantially opposite said bonnet; a main fan for forcing air from said return air pipe through said entrance, heating and exit chambers and into said heated air pipe; and an auxiliary fan for discharging a stream of cool air into said vent pipe in a direction away from said bonnet to cool said products of combustion and aspirate same from said bonnet.

ORAN W. OTT.

REFERENCES CITED

The following references are of record in the file of this patent:

UNITED STATES PATENTS

| Number | Name | Date |
|---|---|---|
| 238,185 | Van Noorden | Feb. 22, 1881 |
| 647,301 | Hollingsworth | Apr. 10, 1900 |
| 1,077,324 | Williams | Nov. 4, 1913 |
| 1,604,271 | Friedman | Oct. 26, 1926 |
| 1,767,869 | Baumgarten | June 24, 1930 |
| 2,281,106 | McCollum | Apr. 28, 1942 |
| 2,286,115 | Shelton | June 9, 1942 |
| 2,333,602 | Van Almelo | Nov. 2, 1943 |
| 2,376,172 | Mueller | May 15, 1945 |